United States Patent [19]

Jarocki

[11] Patent Number: 5,459,890
[45] Date of Patent: Oct. 24, 1995

[54] WATER BLENDING AND RECYCLING APPARATUS

[76] Inventor: Roger A. Jarocki, P.O. Box 245, Owen, Wis. 54460

[21] Appl. No.: 290,683

[22] Filed: Aug. 15, 1994

Related U.S. Application Data

[63] Continuation of Ser. No. 41,151, Apr. 1, 1993, abandoned.

[51] Int. Cl.$^6$ ............................................ E03C 1/00
[52] U.S. Cl. .................... 4/668; 4/598; 126/362; 236/12.12
[58] Field of Search .................. 4/598, 668; 236/12.12; 126/362; 137/337

[56] References Cited

U.S. PATENT DOCUMENTS

| | | | |
|---|---|---|---|
| 4,700,884 | 10/1987 | Barrett et al. | 4/668 X |
| 4,909,435 | 3/1990 | Kidouchi et al. | 4/668 X |
| 5,261,443 | 11/1993 | Walsh | 126/362 X |

*Primary Examiner*—Charles E. Phillips

[57] ABSTRACT

A programmable electronic control controls water flow from a first electronically controlled valve assembly which receives water from the first water source, e.g. cold water. A second electronically controlled valve assembly is under the control of the programmable electronic control and controls the outflow of water received from a second water source, e.g. hot water. A mixing chamber assembly receives and mixes water coming from the first valve assembly and from the second valve assembly. A third electronically controlled valve assembly is connected to the mixing chamber assembly through a pipe and is under the control of the programmable electronic control. A temperature sensor assembly is connected to the programmable electronic control and senses water temperature at the third valve assembly. The temperature sensor provides a signal to the programmable electronic control representing the water temperature of the blended water sensed at the third valve assembly. The temperature signal is employed for controlling water flow through the first valve assembly and the second valve assembly to the mixing chamber assembly and to the third valve assembly. An output assembly, e.g. a shower head, is connected to the third valve assembly. A recycle assembly is also connected to the third valve assembly and to the first tank assembly. The third valve assembly is for controlling water flow from the mixing chamber assembly to either the output assembly or to the recycle assembly.

3 Claims, 6 Drawing Sheets

FIG. 5

SYSTEM STATUS TABLE

| CONDITION | COLD/HOT WATER BLENDING UNIT (FIG. 3) | | | | OUTPUT/RECYCLE VALVE (FIG. 2)(V3) | | AIR BLEED VALVE (V8) | WATER PUMP FOR HOLD-TANK | HOT WATER TANK | | | | |
|---|---|---|---|---|---|---|---|---|---|---|---|---|---|
| | MANUAL CW (V10) | MANUAL HW (V11) | SYSTEM CONT-ROLLED CW (V1) | SYSTEM CONT-ROLLED HW (V2) | INPUT TO OUTPUT | INPUT TO RECYCLE | | | HOT WATER OUTPUT VALVE (V6) | COLD WATER INPUT VALVE (V7) | RE-CYCLE VALVE (V4) | PRES-SURE EQUILI-ZATION VALVE (V5) | OVER FLOW VALVE (V9) |
| SYSTEM OFF (MANUAL OPERATION) | OPEN OR CLOSED | OPEN OR CLOSED | OPEN | OPEN | OPEN | CLOSED | CLOSED | OFF | OPEN | OPEN | CLOSED | CLOSED | CLOSED |
| SYSTEM ON RECYCLING | OPEN | OPEN | OPEN OR CLOSED | OPEN OR CLOSED | CLOSED | OPEN | CLOSED | ON | OPEN | CLOSED | OPEN | OPEN | CLOSED |
| SYSTEM ON OUTPUTTING TO SHOWER HEAD AND DRAINING HOLDING TANK DURING OPERATION | OPEN | OPEN | OPEN OR CLOSED | OPEN OR CLOSED | OPEN | CLOSED | OPEN DURING DRAIN-AGE OF HOLD-ING TANK OTHER-WISE CLOSED | ON DURING DRAIN-AGE OF HOLD-ING TANK OTHER-WISE OFF | OPEN | CLOSED DURING DRAIN-AGE OF HOLD-ING TANK OTHER-WISE OPEN | OPEN DURING DRAIN-AGE OF HOLD-ING TANK OTHER-WISE CLOSED | OPEN DURING DRAIN-AGE OF HOLD-ING TANK OTHER-WISE CLOSED | CLOSED |
| SYSTEM ON OUTPUTTING TO SHOWER HEAD WITHOUT DRAINING HOLDING TANK | OPEN | OPEN | OPEN OR CLOSED | OPEN OR CLOSED | OPEN | CLOSED | CLOSED | OFF | OPEN | OPEN | CLOSED | CLOSED | CLOSED |
| DRAINING HOLDING TANK AFTER OUT-PUTTING IS STOPPED | OPEN | OPEN | CLOSED | CLOSED | OPEN | CLOSED | OPEN | ON | OPEN | CLOSED | OPEN | OPEN | CLOSED |

WATER BLENDING AND RECYCLING APPARATUS

This application is a continuation of application Ser. No. 08/041,151, filed Apr. 1, 1993, now abandoned.

BACKGROUND OF THE INVENTION

1. Field of the Invention

The present invention relates generally to an apparatus for blending hot and cold water for washing operations, and more particularly, to an especially adapted to effect water and energy conservation in preparing and dispensing blends of hot and cold water.

2. Description of the Prior Art

Washing facilities, whether for people or objects, are generally equipped with a hot water supply and a cold water supply. Common facilities for people include sinks, showers, and bathtubs. Common facilities for objects, such as laundry, include wash tubs.

The washing operation often requires water at a temperature that is intermediate between the temperature of the cold water supply and the hot water supply. For example, a cold water supply may be near 42 degrees Fahrenheit. A hot water supply may be near 140 degrees Fahrenheit. A comfortable intermediate temperature for human showering may be near 91 degrees Fahrenheit, which is a temperature half way between the hot and cold temperatures.

Showers, bathtubs, and sinks are often equipped with single water outlets which blend hot and cold water. However, in arriving at the water blend of the desired temperature, often a substantial quantity of water flows out of the water outlet and down the drain. The water that flows down the drain is wasteful in a number of ways. Water is wasted. Energy to pump the water to the faucet is wasted. Energy used to heat the water is wasted. In this respect, it would be desirable if a water blending apparatus were provided that reduced waste of water and the energy employed to move and heat the water.

Often, when a person takes a shower, the person steps into a cold shower stall and undergoes a dose of uncomfortably cold or hot water before a comfortable temperature blend of water is obtained. It would be desirable, therefore, if a water blending apparatus were provided that avoided exposing a person to an uncomfortably cold or hot dose of water in a shower.

When hot and cold water are blended to arrive at a comfortable intermediate temperature, a quantity of water, which may be quite substantial, that is deemed to be either too hot or too cold is wasted down the drain. In this respect, it would be desirable if the water that is deemed to be too hot or too cold could be retained and recycled so that it can be blended to a comfortable temperature.

A number of prior art systems are known that are designed to save water. For example, U.S. Pat. No. 4,037,567 of Torres discloses a water heating system that includes a recycling loop in which water circulates to be heated by hot gases that are exhausted up a flue. U.S. Pat. No. 4,812,237 of Cawley et al discloses a water recycle system which converts used water or dirty into potable water. U.S. Pat. No. 4,893,364 of Keeler discloses a water recycling shower wherein water once used in the showering process is held in a storage tank and recycled during a portion of the showering process in place of fresh water. U.S. Pat. No. 4,977,885 of Herweyer et al discloses hot water heating system that includes a primary tank and an auxiliary tank. When the demand for heated water exceeds the capacity of the primary tank, water is drawn from the auxiliary tank. Otherwise, the water in the auxiliary tank is heated but unused and held in reserve. U.S. Pat. No. 5,004,536 of Geisler discloses a water reclamation apparatus designed to recycle dirty water that needs to be cleaned as part of a reclamation process.

Thus, while the foregoing body of prior art indicates it to be well known to use systems to recycle water, the prior art described above does not teach or suggest a water blending and recycling apparatus that reduces waste of water and the energy employed to move and heat the water. Also, the prior art does not provide a water blending apparatus that avoids exposing a person to an uncomfortably cold or hot dose of water in a shower. The prior art does not provide an apparatus for retention of water that is deemed to be too hot or too cold so that it could be recycled and blended to a comfortable temperature. The foregoing disadvantages are overcome by the unique water blending and recycling apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a programmable electronic control that controls water flow from a first electronically controlled valve assembly which receives water from the first water source, e.g. cold water. A second electronically controlled valve assembly is under the control of the programmable electronic control and controls the outflow of water received from a second water source, e.g. hot water. A mixing chamber assembly receives and mixes water coming from the first valve assembly and from the second valve assembly. A third electronically controlled valve assembly is connected to the mixing chamber assembly through a pipe and is under the control of the programmable electronic control. A temperature sensor assembly is connected to the programmable electronic control and senses water temperature at the third valve assembly. The temperature sensor provides a signal to the programmable electronic control representing the water temperature of the blended water sensed at the third valve assembly. The temperature signal is employed for controlling water flow through the first valve assembly and the second valve assembly to the mixing chamber assembly and to the third valve assembly. An output assembly, e.g. a shower head, is connected to the third valve assembly. A recycle assembly is also connected to the third valve assembly and to the first tank assembly. The third valve assembly is for controlling water flow from the mixing chamber assembly to either the output assembly or to the recycle assembly.

In the water blending and recycling apparatus of the invention, the recycle assembly may also include a fourth electronically controlled valve assembly, connected between the third valve assembly and the first tank assembly, for controlling recycle water flow from the third valve assembly and the first tank assembly.

The recycle assembly may also include a fifth electronically controlled valve assembly, connected between the fourth valve assembly and the first tank assembly, for equalizing pressure between the recycle assembly and the first tank assembly.

The water blending and recycling apparatus of the invention may also include a sixth electronically controlled valve assembly, connected between the first tank assembly and the second valve assembly, for controlling water flow from the first tank assembly to the second valve assembly. The apparatus may also include a seventh electronically controlled valve assembly, connected between the first water source and the first tank assembly, for controlling water flow from the first water source and the first tank assembly.

The recycle assembly may also include an eighth electronically controlled valve assembly, connected between the third valve assembly and the fourth valve assembly, for admitting air to the recycle assembly when water is being drained from the recycle assembly. In addition, the recycle assembly may also include a holding tank, connected between the eighth valve assembly and the fourth valve assembly, for receiving water from the third valve assembly and for discharging water to the first tank assembly during water recycling. The recycle assembly may also include a water pump, connected between the holding tank and the fourth valve assembly, for pumping water from the holding tank to the first tank assembly during water recycling.

All of the electronically controlled valve assemblies may be controlled by a pressure/vacuum actuation system which is controlled by the programmable electronic control.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved water blending and recycling apparatus which has all of the advantages of the prior art and none of the disadvantages.

It is another object of the present invention to provide a new and improved water blending and recycling apparatus which may be easily and efficiently manufactured and marketed.

It is a further object of the present invention to provide a new and improved water blending and recycling apparatus which is of durable and reliable construction.

An even further object of the present invention is to provide a new and improved water blending and recycling apparatus which is susceptible of a low cost of manufacture with regard to both materials and labor, and which accordingly is then susceptible of low prices of sale to the consuming public, thereby making such water blending and recycling apparatus available to the buying public.

Still yet a further object of the present invention is to provide a new and improved water blending and recycling apparatus that reduces waste of water and the energy employed to move and heat the water.

Still another object of the present invention is to provide a new and improved water blending and recycling apparatus that avoids exposing a person to an uncomfortably cold or hot dose of water in a shower.

Yet another object of the present invention is to provide a new and improved water blending and recycling apparatus that retains water that is deemed to be too hot or too cold so the water can be recycled so that it can be blended to a comfortable temperature.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a system status table for the embodiment shown in FIG. 1 indicating the state of various components during different modes of operation.

DESCRIPTION OF THE PREFERRED EMBODIMENT

Figure 1:
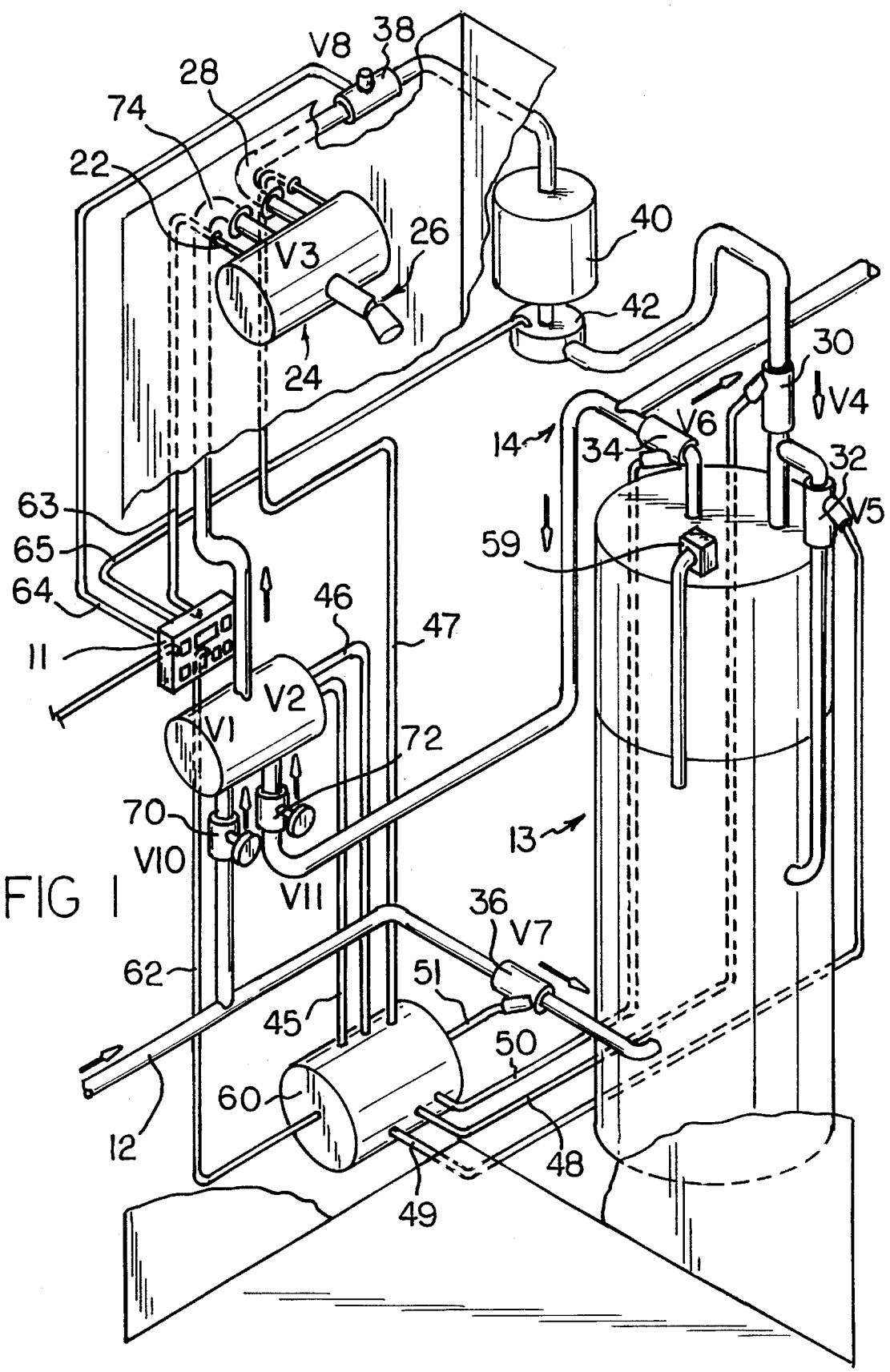
FIG. 1 is a perspective view showing a preferred embodiment of the water blending and recycling apparatus of the invention.
Figure 3:
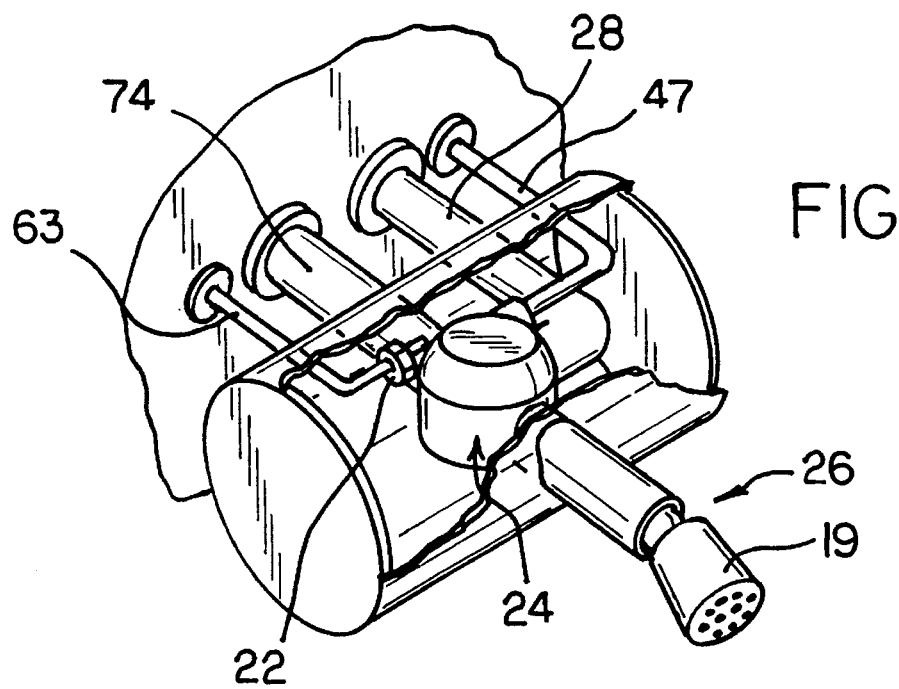
FIG. 3 is an enlarged, perspective view, partially broken away, of the cold/hot water blending assembly of FIG. 1.
Figure 2:
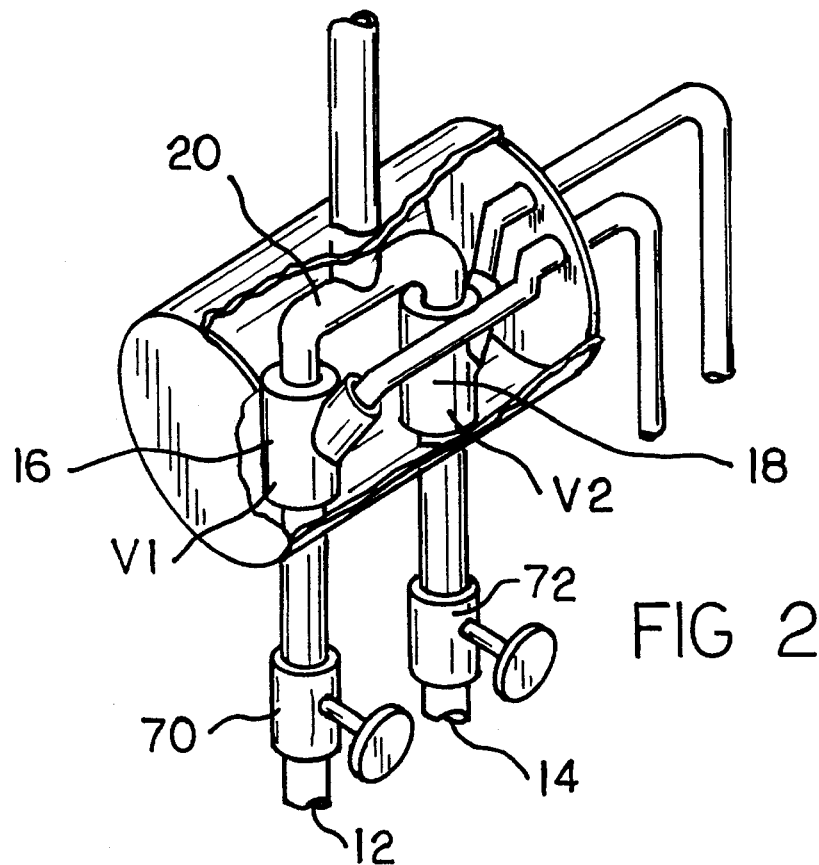
FIG. 2 is an enlarged, perspective view, partially broken away, of the shower head assembly of FIG. 1.
Figure 4:
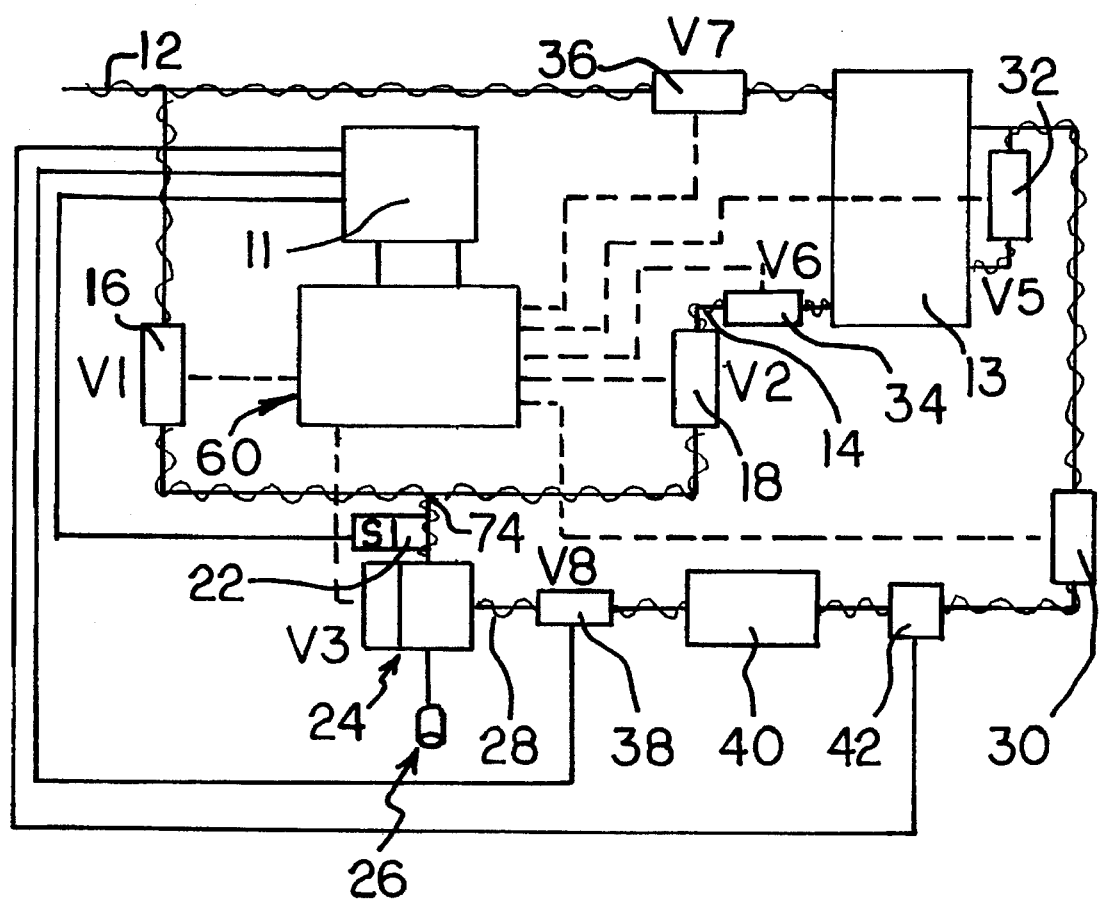
FIG. 4 is a schematic diagram of the embodiment of the invention shown in FIG. 1 wherein water pipes are indicated by wavy lines, pressure/vacuum conduits are indicated by dashed lines, and electrical conductors are indicated by solid straight lines.

With reference to the drawings, a new and improved water blending and recycling apparatus embodying the principles and concepts of the present invention will be described.

Turning initially to FIGS. 1–4, there is shown a preferred embodiment of the water blending and recycling apparatus of the invention generally designated by reference numeral 10. The water blending and recycling apparatus 10 includes a first water source 12 for providing water at a first temperature and a second water source 14 for providing water at a second temperature. The first water source 12 provides cold water; that is water at approximately 42 degrees Fahrenheit. The second water source 14 includes a first tank assembly 13 for storing a quantity of water at the second temperature. This is a hot water tank for heating and storing hot water at approximately 140 degrees Fahrenheit.

Figure 7:
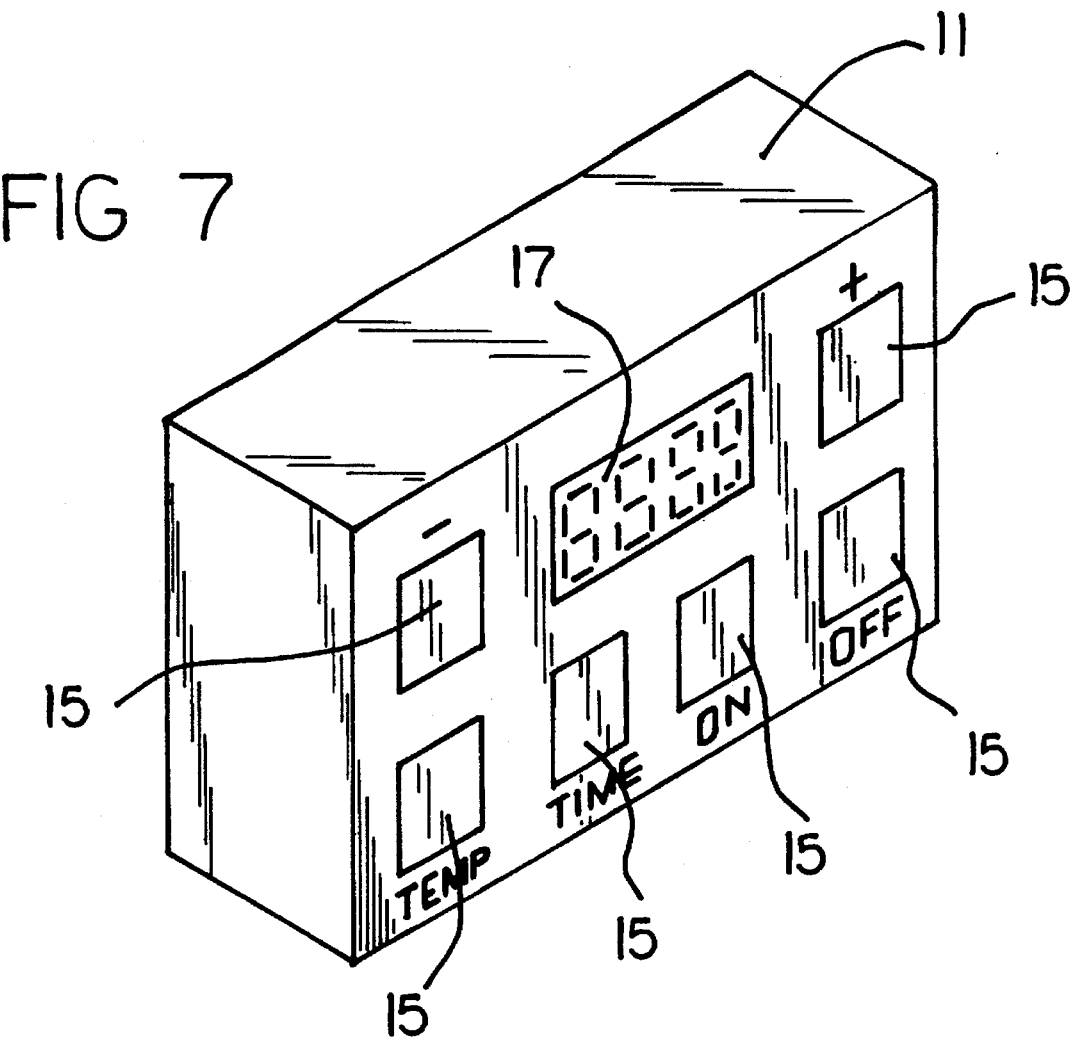
FIG. 7 is a perspective view of the exterior of the controller for the embodiment shown in FIG. 1.

A programmable electronic controller 11 is provided. This may include conventional digital logic circuitry including registers and timing modules. It may be embodied as a small programmable digital computer. As shown in FIG. 7, the programmable electronic controller 11 includes input keys 15 and includes a display device 17. Parameters of system operation that are programmable include: desired temperature of blended water and time at which the blended water is intended to be used. On and Off keys are also provided. The programmable electronic controller 11 communicates with the sensor, valve assemblies, and pumps in the apparatus of the invention, as described further below, by conventional, well known techniques for computer controlled apparatus. Overall system operation is depicted in the "System Status Table" set forth in FIG. 5, and well known techniques for programming a computer for operation in accordance with the system operation can be employed.

A first electronically controlled valve assembly 16 is under the control of the programmable electronic controller 11 and receives water from the first water source 12. The first valve assembly 16 is used for controlling water flow from the first water source 12. A second electronically controlled valve assembly 18 is under the control of the programmable electronic controller 11 and receives water from the second water source 14 and is used for controlling water flow from the second water source 14.

A mixing chamber assembly 20 is used for receiving and mixing water coming from the first valve assembly 16 and from the second valve assembly 18.

A third electronically controlled valve assembly 24 is connected to the mixing chamber assembly 20 and is under the control of the programmable electronic controller 11. A temperature sensor assembly 22 is connected to the programmable electronic controller 11 and is used for sensing water temperature at the third valve assembly 24. The temperature sensor assembly 22 provides a signal to the programmable electronic controller 11 which represents the water temperature sensed at the third valve assembly 30. The temperature signal is employed for controlling water flow through the first valve assembly 16 and the second valve assembly 18 into the mixing chamber assembly 20, and to the third valve assembly 24.

An output assembly 26 is connected to the third valve assembly 24. The output assembly 26 includes shower head 19. A recycle assembly, a portion of which is recycle line 28, is also connected to the third valve assembly 24. Other portions of the recycle assembly, described below, are connected to the first tank assembly 13. More specifically, the third valve assembly 24 is used for controlling water flow from the mixing chamber assembly 20 to either the output assembly 26 or to the recycle assembly.

The recycle assembly also includes a fourth electronically controlled valve assembly 30 which is connected between the third valve assembly 24 and a top portion of the first tank assembly 13 and is used for controlling recycle water flow from the third valve assembly 24 to the first tank assembly 13. The recycle assembly also includes a fifth electronically controlled valve assembly 32 which is connected between the fourth valve assembly 30 and a middle portion of the first tank assembly 13 and is used for equalizing pressure between the recycle assembly and the first tank assembly 13 when the fourth valve assembly 30 is open and the fifth valve assembly 32 is open. More specifically, this condition is disclosed in FIG. 5 which shows valve V4 (the fourth valve assembly 30) and the valve V5 (the fifth valve assembly 32) to be in an open condition when pressure equalization takes place.

The water blending and recycling apparatus 10 of the invention also includes a sixth electronically controlled valve assembly 34 which is connected between the first tank assembly 13 and the second valve assembly 18 and is used for controlling water flow from the first tank assembly 13 to the second valve assembly 18. The water blending and recycling apparatus 10 also includes a seventh electronically controlled valve assembly 36 which is connected between the first water source 12 and the first tank assembly 13 and is used for controlling water flow from the first water source 12 and the first tank assembly 13.

The recycle assembly also includes an eighth electronically controlled valve assembly 38 which is connected between the third valve assembly 24 and the fourth valve assembly 30 and is used for admitting air to the recycle assembly when water is being drained from the recycle assembly. In addition, a holding tank 40 is connected between the eighth valve assembly 38 and the fourth valve assembly 30 and is used for receiving water from the third valve assembly 24 and for discharging water to the first tank assembly 13 during water recycling. A water pump 42 is connected between the holding tank 40 and the fourth valve assembly 30 and is used for pumping water from the hold rag tank 40 to the first tank assembly 13 during water recycling. It is noted that the first tank assembly 13 includes a conventional overflow valve designated as ninth valve assembly 59.

The first, second, third, fourth, fifth, sixth, and seventh electronically controlled valve assemblies include pressure/vacuum actuation modules 21 (see FIG. 6) which are controlled by the programmable electronic controller 11. The pressure/vacuum actuation modules 21 are contained in a pressure distributor assembly 60. Each pressure/vacuum actuation module 21 has connections to a pressure manifold 23 and a vacuum manifold 25. The pressure manifold 23 receives positive pressure from the positive pressure side 27 of pressure/vacuum pump 29. The vacuum manifold 25 receives negative pressure (vacuum) from the vacuum side 31 of the pressure/vacuum pump 29. Electronically controlled valves 33 control whether the output air lines 45–51 receive positive or negative pressure for controlling the respective valve assemblies.

Figure 6:
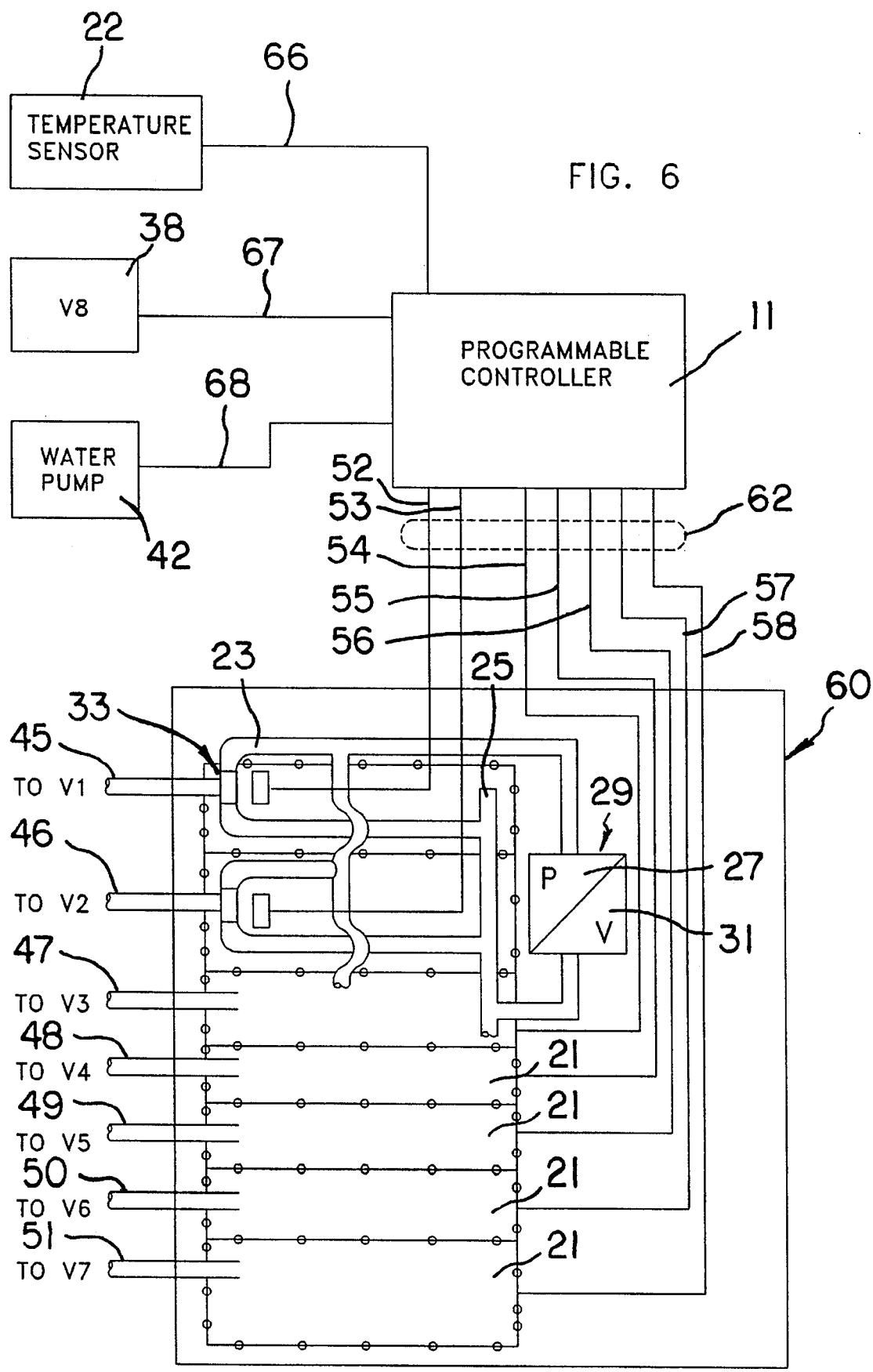
FIG. 6 is a partial schematic diagram of the connections between the electronic controller and the system components connected to the electronic controller.

As shown in FIG. 6, the programmable controller 11 is connected to the temperature sensor assembly 22 for receiving temperature signals. The programmable controller 11 is also connected to the eighth valve assembly 38 and the water pump 42 for control thereof.

Respective wires 52–58 connect the controller 11 to the respective pressure/vacuum actuation modules 21. A conduit 62 contains the wires 52–58 that run from the controller 11 to the pressure distributor assembly 60. In addition, respective conduits 63, 64, and 65 contain respective wires 66, 67, and 68 that run from the controller 11 to the temperature sensor assembly 22, the eighth valve assembly 38, and the water pump 42, respectively.

A detailed description of the operation of the water blending and recycling apparatus 10 of the invention is described in the "System Status Table" in FIG. 5.

More specifically, the apparatus of the invention 10 can be completely turned off. In such a case a first manually controlled valve 70 for cold water and a second manually controlled valve 72 would be opened or closed as desired. The first valve assembly 16 and the second valve assembly 18 are open. The third valve assembly 24 has its input end 74 connected to the output assembly 26. The path from the input end 74 to the recycle line 28 is closed. The eighth valve assembly 38 for air bleeding the recycle line 28 is closed. The water pump 42 is off. The sixth valve assembly 34 is open. The seventh valve assembly 36 is open. The fourth valve assembly 30 is closed. The fifth valve assembly 32 is closed.

In all cases of system operation, unless an emergency situation occurs, the overflow valve assembly, that is ninth valve assembly 59, remains closed.

When a person intends to use the shower a predetermined time henceforward, the person will program the controller 11 to prepare water at the desired temperature for use at the appropriate time. From the time the controller 11 is set to the time when use of the shower is intended, water is recycled in the water blending and recycling apparatus 10 of the invention. More specifically, as in all modes of system operation when the water blending and recycling apparatus 10 of the invention is employed, the first manually controlled valve 70 for cold water and the second manually controlled valve 72 for hot water are left open. Under control of the controller 11, the first valve assembly 16 and the second valve assembly 18 are either opened or closed to obtain a blend of cold and hot water that was specified by the person. The third valve assembly 24 has its input end 74 connected to the recycle line 28. The path from the input end 74 to the output assembly 26 is closed. The eighth valve assembly 38 for air bleeding the recycle line 28 is closed. Water is flowing to the holding tank 40, and the water pump 42 is on. The sixth valve assembly 34 is open. The seventh valve assembly 36 is closed. The fourth valve assembly 30 is open. The fifth valve assembly 32 is open.

After the predetermined time has expired and the water temperature has been blended to obtain the desired temperature, the water blending and recycling apparatus 10 is ready to direct water out of the shower head 19. In addition, it is recalled that water has been accumulating in the holding tank 40 during the recycle mode. This is so because some cold water is added to the system when some hot water must be cooled down to the intermediate temperature of the cold/hot water blend.

For example, a desirable intermediate temperature between the cold water temperature of 42 degrees F. and the hot water temperature of 140 degrees F. is 91 degrees F. This means that for every gallon of hot water at 140 degrees, it takes one gallon of water at 42 to arrive at two gallons of a water blend at 91 degrees. If water is recycling at the rate of approximately two gallons per minute for five minutes, then ten gallons would be recycled. Of the ten gallons recycled, five gallons were previously in the system as hot water, and five gallons are added as cold water. Thus, five gallons have been added to the system. In this respect, the capacity of the holding tank 40 should be five gallons at a minimum. To provide an adequate margin of error, a ten gallon holding tank 40 is desirable.

Drainage of the holding tank 40 must take place before the next recycling phase. A preferred method of draining the holding tank 40 is to drain the holding tank simultaneously as water is being outputted through the shower head 19. This way, the blended water in the holding tank 40 reaches the user of the shower. In this preferred mode of operation, Under control of the controller 11, the first valve assembly 16 and the second valve assembly 18 are either opened or closed to obtain a blend of cold and hot water that was specified by the person. The third valve assembly 24 has its input end 74 connected to the output assembly 26. The path from the input end 74 to the recycle line 28 is closed. The eighth valve assembly 38 for air bleeding the recycle line 28 is opened during drainage of the holding tank 40 and is otherwise closed. The water pump 42 is on during drainage of the holding tank 40 and is otherwise off. A level sensor assembly (not shown) can be used for shutting off the water pump 42 when the water level in the holding tank 40 is reduced to a predetermined level. The sixth valve assembly 34 is open. The seventh valve assembly 36 is open during drainage of the holding tank 40 and is otherwise open. The fourth valve assembly 30 is open during drainage of the holding tank 40 and is otherwise closed. The fifth valve assembly 32 is open during drainage of the holding tank 40 and is otherwise closed.

Alternately, the water blending and recycling apparatus 10 can supply blended water to the shower head 19 without simultaneously draining the holding tank 40. In this mode of system operation, under control of the controller 11, the first valve assembly 16 and the second valve assembly 18 are either opened or closed to obtain a blend of cold and hot water that was specified by the person. The third valve assembly 24 has its input end 74 connected to the output assembly 26. The path from the input end 74 to the recycle line 28 is closed. The eighth valve assembly 38 for air bleeding the recycle line 28 is closed. The water pump 42 is off. The sixth valve assembly 34 is open. The seventh valve assembly 36 is open. The fourth valve assembly 30 is closed. The fifth valve assembly 32 is closed.

Subsequent to using the output water, the holding tank 40 must be drained to prepare for the next recyling mode. More specifically, under control of the controller 11, the first valve assembly 16 and the second valve assembly 18 are closed. The third valve assembly 24 has its input end 74 connected to the output assembly 26. The path from the input end 74 to the recycle line 28 is closed. The eighth valve assembly 38 for air bleeding the recycle line 28 is opened. The water pump 42 is on. The sixth valve assembly 34 is open. The seventh valve assembly 36 is closed. The fourth valve assembly 30 is open. The fifth valve assembly 32 is open.

Essentially all major modes of operation of the water blending and recycling apparatus 10 of the invention have been disclosed above. Moreover, the components of the invention are inexpensive and readily available.

It is apparent from the above that the present invention accomplishes all of the objects set forth by providing a new and improved water blending and recycling apparatus that is low in cost, relatively simple in design and operation, and which may advantageously be used to provide water blending with reduced waste of water and the energy employed to move and heat the water. With the invention, a water blending apparatus is provided that avoids exposing a person to an uncomfortably cold or hot dose of water in a shower. With the invention, water that is deemed to be too hot or too cold is retained and recycled so that it can be blended to a comfortable temperature.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved water blending and recycling apparatus, comprising:

first water source means for providing water at a first temperature, second water source means for providing water at a second temperature, said second water source including first tank assembly means for storing a quantity of water at the second temperature, wherein second water source means includes a hoot water heater, means for providing programmable electronic control, first electronically controlled valve assembly means, under the control of said means for providing programmable electronic control for receiving and controlling water flow from said first water source means, second electronically controlled valve assembly means, under the control of said means for providing programmable electronic control for receiving and controlling flow from said second water source means, mixing chamber assembly means for receiving and mixing water combine from said first valve assembly means and from said second valve assembly means, third electronically controlled valve assembly means, connected to said mixing chamber assembly means, and under the control of said means for providing programmable electronic control temperature sensor assembly means, connected to said means for providing programmable electronic control, for sensing water temperature at said third valve assembly means, and for providing a signal to said means for providing programmable electronic control, representing the water temperature sensed at said third valve assembly means, said temperature signal employed for controlling water flow through said first valve assembly means and said second valve assembly means into said mixing chamber assembly means, and to said third valve assembly means, an output assembly, including a shower head, connected to said third valve assembly means, and recycle assembly means, connected between said third valve assembly means, and said first tank assembly means, wherein said third valve assembly means is for controlling water flow from said mixing chamber assembly to either said output assembly or to said recycle assembly means, wherein said recycle assembly means includes, fourth electronically controlled valve assembly means, connected between said third valve assembly means an a top portion of said first tank assembly means, for controlling recycle water flow from said third valve assembly means to said first tank assembly means, and fifth electronically controlled valve assembly means, connected between said fourth valve assembly means and a middle portion of said first tank assembly means, for equalizing pressure between said recycle assembly means and said first tank assembly means when said fourth electronically controlled valve assembly means is in an open condition and said fifth electronically controlled valve assembly is in an open condition.

2. The apparatus described in claim 1, further including:

sixth electronically controlled valve assembly means, connected between said first tank assembly means and said second valve assembly means, for controlling water flow from said first tank assembly means to said second valve assembly means.

3. The apparatus described in claim 1, further including:

seventh electronically controlled valve assembly means, connected between said first water source means and said first tank assembly means, for controlling water flow from said first water source means and said first tank assembly means.

* * * * *